June 2, 1959     T. F. WINTERS     2,888,959
MACHINE FOR ASSEMBLING BED SPRINGS
Filed May 28, 1957     5 Sheets-Sheet 1

INVENTOR.
Thomas F. Winters
BY
Townsend Townsend & Caplan
Attorneys

June 2, 1959   T. F. WINTERS   2,888,959
MACHINE FOR ASSEMBLING BED SPRINGS
Filed May 28, 1957   5 Sheets-Sheet 2

INVENTOR.
Thomas F. Winters

BY
Attorneys

June 2, 1959     T. F. WINTERS     2,888,959
MACHINE FOR ASSEMBLING BED SPRINGS
Filed May 28, 1957     5 Sheets-Sheet 3
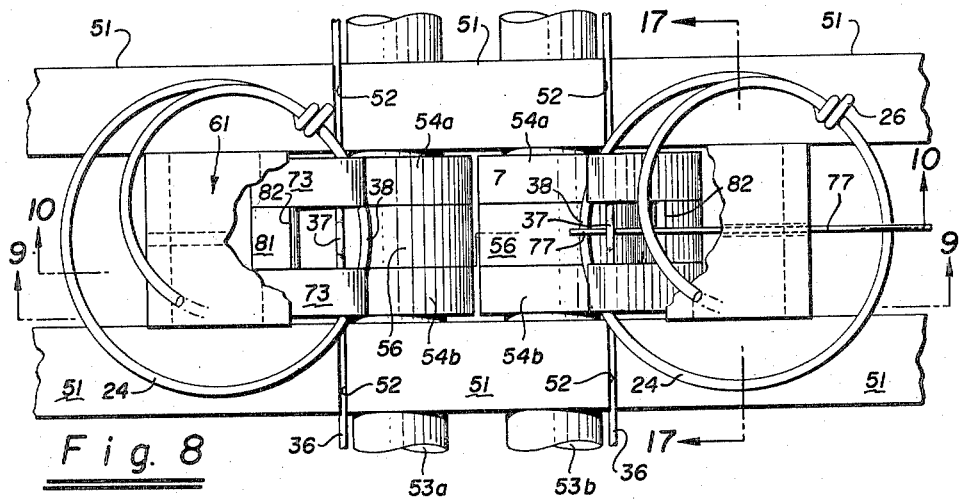
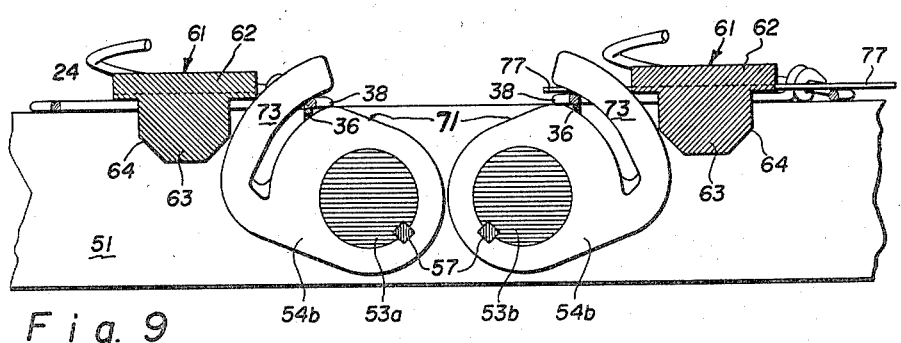
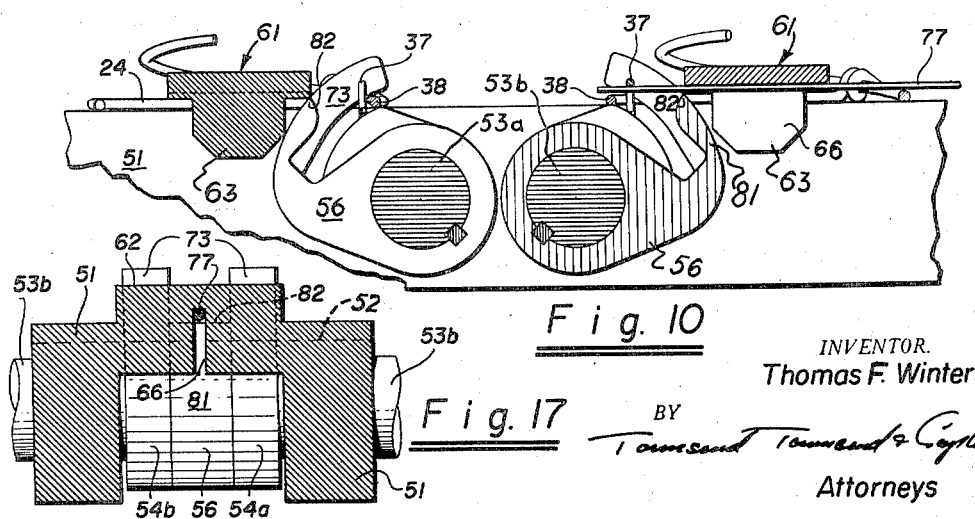
INVENTOR.
Thomas F. Winters
BY
Attorneys June 2, 1959  T. F. WINTERS  2,888,959
MACHINE FOR ASSEMBLING BED SPRINGS
Filed May 28, 1957  5 Sheets-Sheet 4
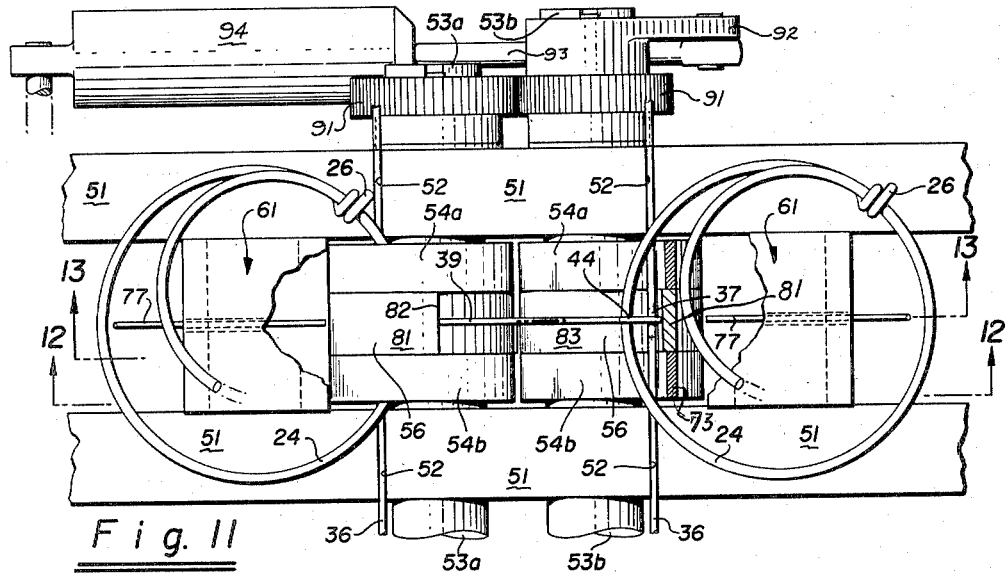
Fig. 11
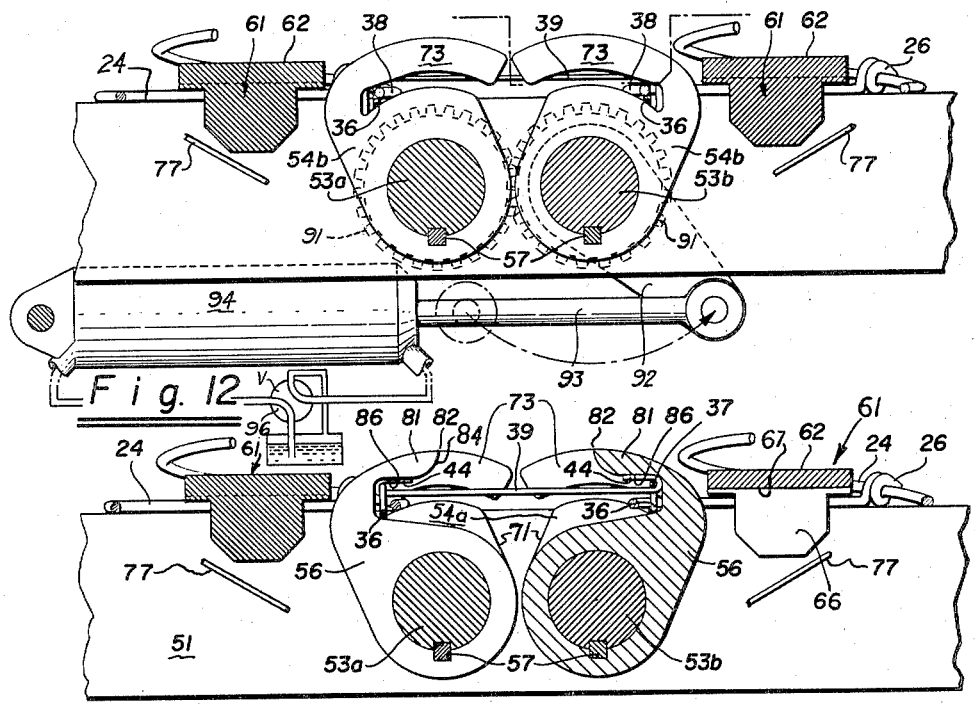
Fig. 12
Fig. 13
INVENTOR.
Thomas F. Winters
BY
Townsend Townsend & Caplan
Attorneys

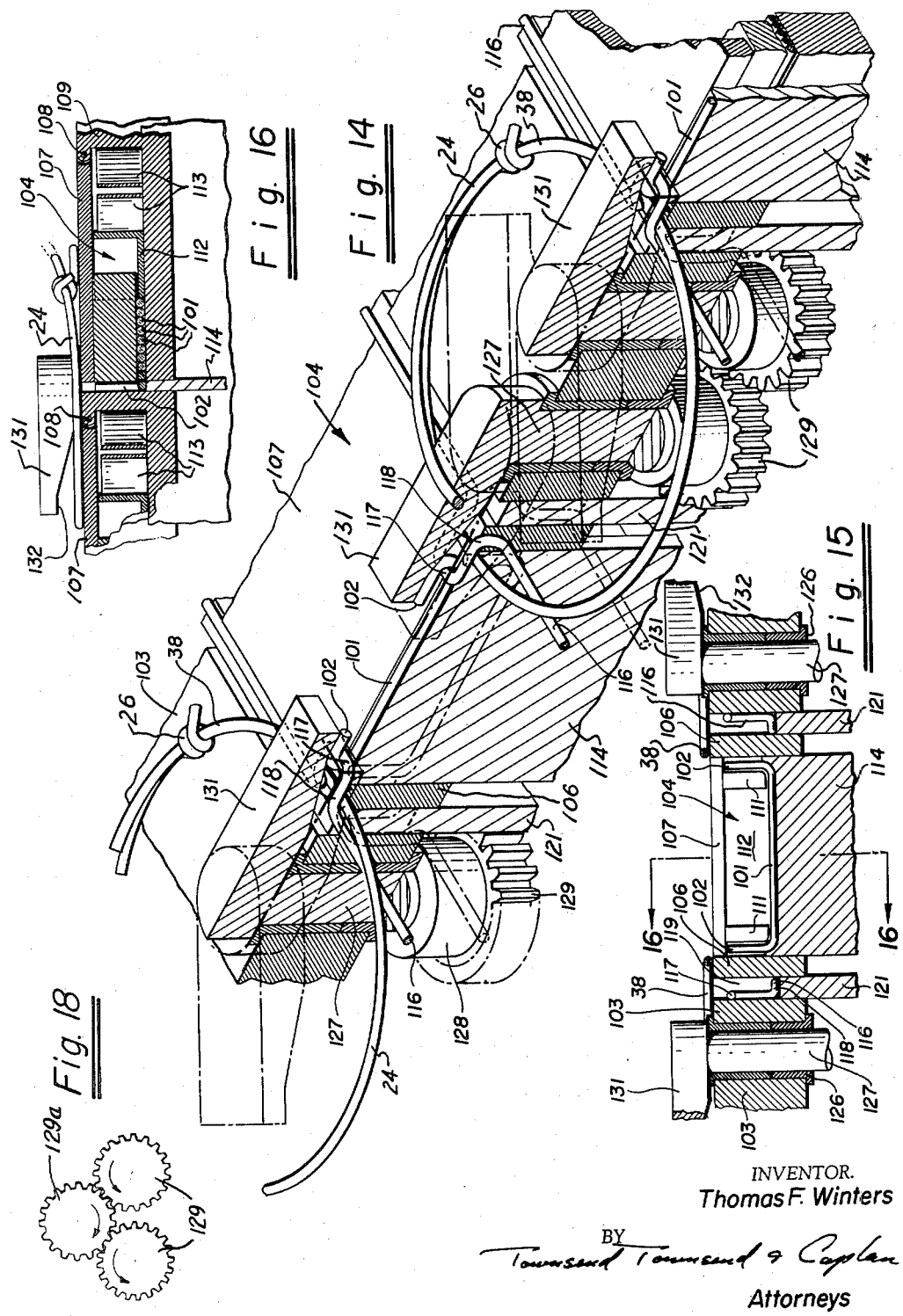

United States Patent Office 2,888,959
Patented June 2, 1959

2,888,959
MACHINE FOR ASSEMBLING BED SPRINGS

Thomas F. Winters, Issaquah, Wash.

Application May 28, 1957, Serial No. 662,283

14 Claims. (Cl. 140—3)

This invention relates to a machine for assembling bed springs.

A bed spring comprises a plurality of volute coil springs arranged in a pattern of longitudinal and transverse rows and secured in position relative to each other in such manner as to permit limited relative movement of the springs under the stresses applied. The small diameter end of each volute coil is secured to the intersection of reticulate wires. The present invention is more concerned with the securing of the large diameter ends of the volute coils. Such large diameter ends are each secured relative to the adjoining coils by a lacing wire which is crimped in the zone of each of the coils and which, in the position of use of the spring (as distinguished from the inverted position of manufacture, as hereinafter set forth), overlies the extreme edge of the largest coil of each coil spring plus a clip which extends transverse to the direction of the lacing wire and interconnects the adjacent lacing wires, the clips also underlying the extreme edge of the largest diameter coil of each spring.

In prior conventional manufacture of springs, the clips heretofore mentioned have been manually applied and bent around the crimped portions of the lacing wires. These manual operations have been the most labor consuming part of the manufacture of bed springs and also, by reason of the fact that such a large number of clips must be applied in a conventional spring, has caused the most difficulties in the manufacture and inspection of such springs.

The present invention comprises a mechanism which automatically locates the lacing wires relative to the coils and elevates the crimped portions relative to the coils so as properly to receive the clips, and then installs and bends the clips.

Accordingly, one of the principal features and advantages of the invention is the saving in labor entailed thereby and the increase in speed of production.

Another feature of the invention is the uniformity of attachment of the clips installed in accordance with this invention over manual methods of clip attachment.

A still further object of the invention is the fact that it provides a mechanism which may readily be installed in an automatic spring assembly machine, the unit being capable of duplication so that the entire spring or any portion thereof may be assembled in a single operation.

Other objects of the present invention will become apparent upon reading the following specification and referring to the accompanying drawings in which similar characters of reference represent corresponding parts in each of the several views.

Figure 5:
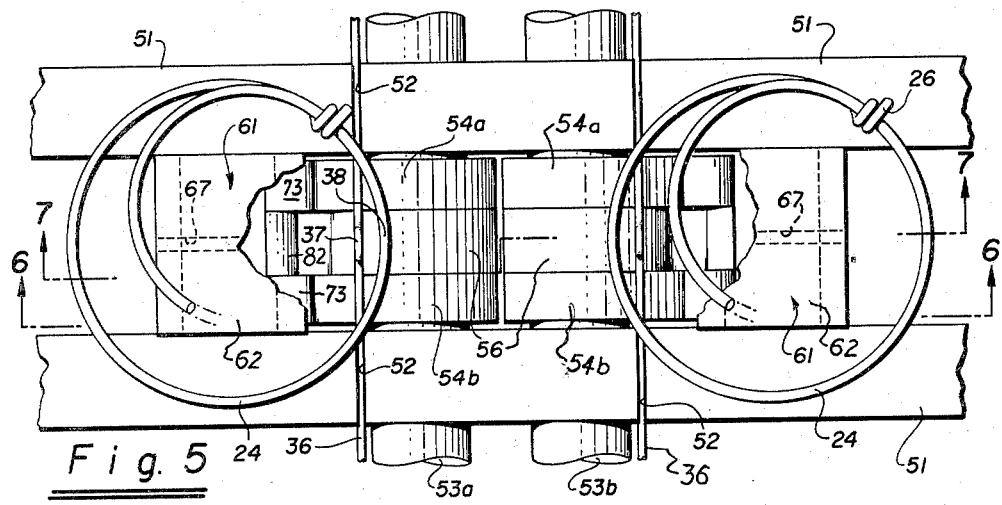
Fig. 5 is a fragmentary top plan of one embodiment of the invention showing the parts in the position of the commencement of the cycle of operations.
Figure 6:
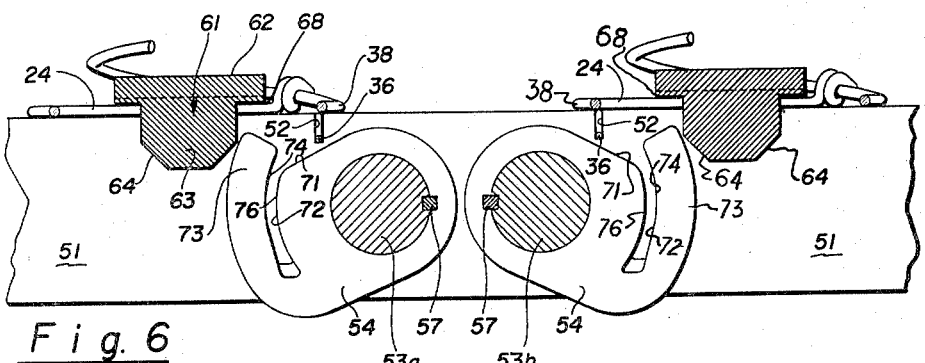
Figure 7:
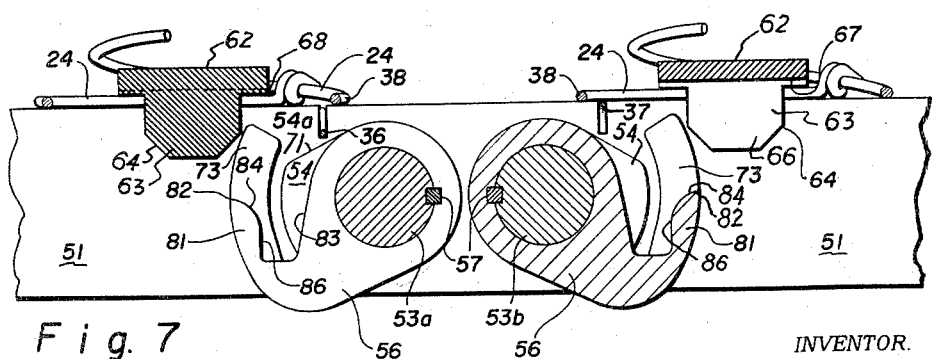

Figs. 6 and 7 are transverse vertical sectional views taken substantially along lines 6—6 and 7—7 of Fig. 5, respectively;

Fig. 8 is a view similar to Fig. 5 showing the parts at one stage of their cycle of operation;

Figs. 9 and 10 are vertical sectional views taken substantially along line 9—9 and 10—10, respectively, of Fig. 8;

Fig. 11 is a view similar to Fig. 5 showing the parts in still another step in the cycle of operations;

Figs. 12 and 13 are vertical sectional views taken substantially along lines 12—12 and 13—13 of Fig. 11;

Fig. 14 is a perspective view partly cut away in section of a modified apparatus;

Fig. 15 is a fragmentary vertical sectional view through a portion of the apparatus of Fig. 14;

Fig. 16 is a vertical sectional view taken substantially along line 16—16 of Fig. 15;

Fig. 17 is a fragmentary transverse sectional view taken substantially along the line 17—17 of Fig. 8; and Fig. 18 is a schematic top plan of the gears used in the modification of Fig. 14.

Figure 1:
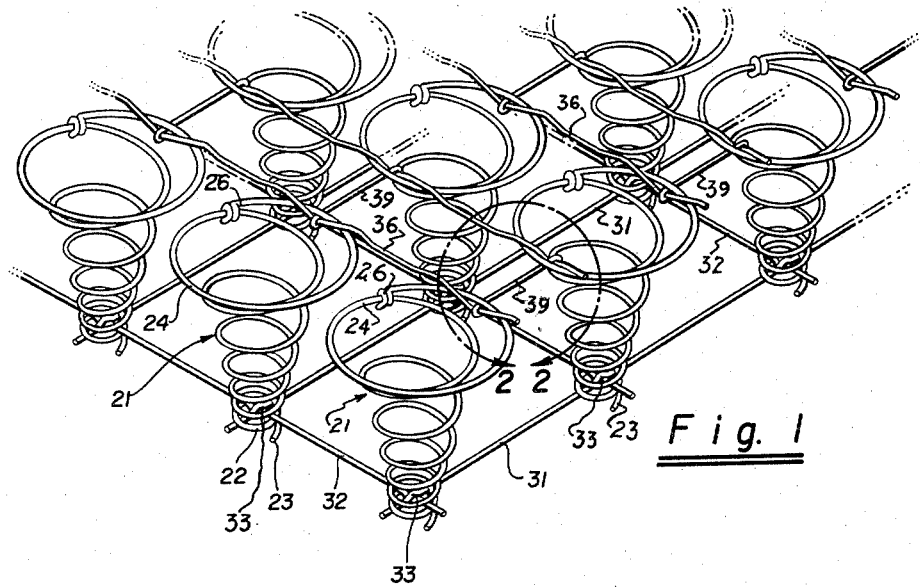
Fig. 1 is a perspective view of a portion of a bed spring in position of use (as distinguished from position of manufacture)
Figure 2:
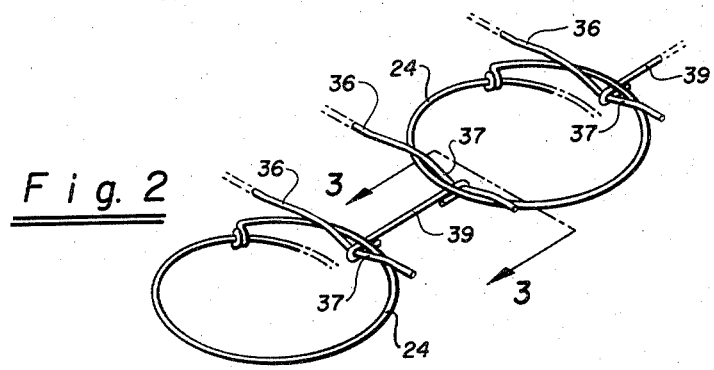
Fig. 2 is an enlarged perspective view of a portion of the structure of Fig. 1 as indicated by arrows 2—2 of Fig. 1.

Turning now to the construction shown in Figs. 1 and 2, it will be seen that the spring construction is comprised of a plurality of volute coil springs 21, each having a small diameter end 22 which terminates in an outwardly diverging pigtail 23. The large diameter end 24 of volute coil 21 terminates in a wrap or knot 26 wound around the next largest diameter coil. Coils 21 are arranged in regular longitudinal and transverse rows, as well understood in the art to which this invention appertains. In the position of use, small diameter ends 22 are lowermost, as illustrated in Fig. 1, but in the operation of the mechanism, as hereinafter set forth, the coils are inverted from the position shown in Figs. 1 and 2.

Figure 4:
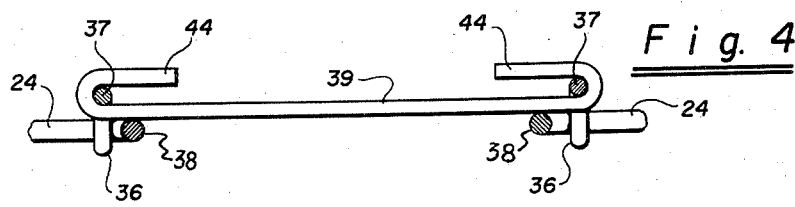
Fig. 4 is a fragmentary sectional view taken substantially along line 4—4 of Fig. 3.
Figure 3:
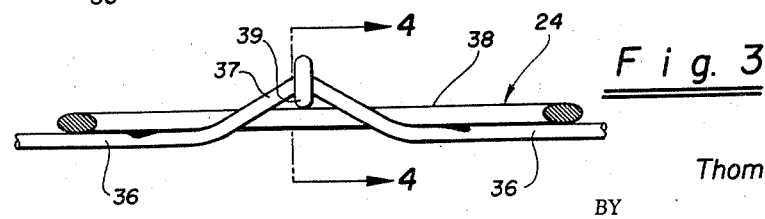
Fig. 3 is a fragmentary sectional view taken along line 3—3 with the parts inverted from the position of Fig. 2.

The first step in the assembly of the spring, as conventionally practiced, is the formation of a reticulate pattern of crimped, overlapping, longitudinal and transverse wires 31 and 32, with crimped portions overlapping at the intersections 33. The small diameter end 22 is screwed into the intersection 33, pigtail 23 facilitating this operation. This operation is conventionally conducted manually at a stage in the construction of the spring prior to the stage with which the present invention is concerned. The springs are then inverted, with the largest diameter portions lowermost, and, as shown in Figs. 3 and 4, lacing wires 36, each formed with a crimp 37, are installed underlying the extreme edge of each largest diameter coil 24, lacing wires 36 assuming a chordal position which is very near to tangency, so that only a small arc 38 of coil 24 is intercepted by wire 36. Crimp 37 extends up above the elevation of largest diameter coil 24 and receives clip 39, the ends 44 of which are bent upwardly around crimped portion 37 and then inwardly. Clips 39 interconnect adjacent coils and extend transverse to the direction of lacing wires 36.

The present invention is concerned with the location of crimped wire 36 relative to large diameter end 24 of coil spring 21 and the attachment of clip 39 to crimped portion 37.

As shown in Fig. 5, the mechanism which is the subject of this invention is installed immediately under largest diameter coil 24, with the coil resting on transversely extending frame members 51, the opposed inner edges of which are spaced apart a distance substantially equal to one-half the diameter of coil 24. Grooves 52 receive lacing wires 36 and so locate them as to underlie largest diameter coils 24 so that wires 36 intercept a short arc 38. Crimped portion 37 is likewise received in slot 52. Extending in a direction parallel to slots 52 and spaced inwardly thereof is a pair of oscillatory shafts 53a and 53b which are caused to revolve in opposite directions by gears 91. Each shaft 53 carries a first and a second hold-down lever 54a and 54b and intermediate levers 54a and 54b is a cut-off lever 56. Levers 54 and 56 are keyed to shafts 53 by keys 57. The spacing between members 51 is sufficient to permit oscillatory movement of levers 54 and 56. The shapes of levers 54 and 56 are of considerable importance to an understanding of the invention and are hereinafter described in detail.

Extending between frame members 51 are anvils 61. Anvils 61 comprise a substantially rectangular top plate 62 and a bifurcated depending extension 63, the corners 64 of which are truncated. Slit 66 between bifurcations 63 extends upwardly from the bottom of anvil 61 and communicates with slot 67 in the underside of plate 62. Extension 63 is of a lesser width than plate 62, as shown in Figs. 6 and 7, in order to provide clearance for levers 54 and 56 in their oscillatory movement. Lower edge 68 of plate 62 of anvil 61 comprises a cutting edge which cooperates with lever 56 as hereinafter described.

Each of levers 54 is preferably formed of flat stock. A cam surface 71 is formed along one edge of levers 54 with the radial distance from the center line of shaft 53 to surface 71 increasing in the direction of rotation of lever 54. Cam surface 71 functions to engage wire 36 in slot 52 and gradually to raise the same until crimped portion 37 is elevated above the level of coil 24. Beyond cam surface 71 is an arcuate slot 72 having its center of curvature on the center line of shaft 53 and defining a finger portion 73 which functions to hook over end 24 at arc 38 and hold coil 24 down against frame member 51. Thus slot 72 has an inner edge 76 (which forms in effect a continuation of cam surface 71 and bears against the underside of wire 36 to retain the same in elevated position) and an outer edge 74 which hooks over coil 24 and prevents it from rising as wire 36 exerts upward pressure.

Lever 56 is likewise keyed to shaft 53 by key 57 and is preferably formed of flat stock with a cut-off finger 81 having a cutting edge 82 at its outer leading edge. A wide slot 83 defines finger 81, the dimensions and position of slot 83 being such as to provide sufficient clearance for the bending of clip 39. Cutting edge 82 coacts with cutting edge 68 of anvil 61 to cut off an appropriate length of wire 77 which is positioned through slots 67, over coil 24 and under crimped portion 37. Finger 81 is formed with its inner surface shaped in a rounded nose 84 immediately beyond cutting edge 82 to bend ends 44 upwardly and finger 81 is further formed with an arcuate portion 86 adjacent nose 84 to bend ends 44 backward to complete the formation of clip 39. The excess of wire 77 which has been clipped off by cutting edges 82 and 68 drops down through slots 67 and 66.

Thus in operation the initial position is shown in Fig. 5 with bottommost coil 24 in contact with member 51 and with lacing wire 36 positioned in slot 52, with crimped portions 37 uppermost. Shafts 53 are rotated approximately 45° to bring lever 54 upwardly and then stopped. The upward movement of lever 54 brings cam surface 71 into contact with wire 36 and biases crimped portion 37 above the level of coil 24. Meanwhile finger 73 grips and holds down coils 38 against member 51. Slot 72 has a sufficient length to provide clearance for full 90° movement of shafts 53, but the function of lever 54 is terminated in the transition from initial position shown in Figs. 5–7 to the intermediate position shown in Figs. 8–10 and thereafter lever 54 functions merely to hold parts 38 and 36 stationary. Immediately following the location of the parts in the position shown in Figs. 8–10, wire 77 is installed in slots 67 threading over coils 24 and under crimped portions 37.

Immediately following the completion of the threading of wire 77, shafts 53 are turned an additional 45° to the completion of their movement and the first part of such turning movement brings cutting edge 82 of lever 56 into shearing position relative to cutting edge 68 of anvil 61, which clips off a length of wire 77 and permits the excess to drop out through slots 67 and 66. Continued movement of lever 56 causes rounded nose 84 to bend end 44 of clip 39 upwardly and thereupon undersurface 86 of finger 81 bends ends 44 backward around crimped portion 37. Inasmuch as several ends 44 are cut and bent simultaneously, a clip 39 having a pair of backwardly bent end hooks around crimped portions 37 of lacing wires 36, clips 39 further passing over lower coils 24.

The means whereby shafts 53 are rotated is subject to considerable variation. Preferably the shafts are geared together by gears 91 so that they are rotated in unison, but in opposite directions. An actuating lever 92 is attached to one of shafts 53 and actuating lever 92 is in turn connected by an articulated connection to piston rod 93 of a hydraulic cylinder 94. A valve mechanism indicated by reference numeral 96 is employed to actuate the hydraulic cylinder 94 so as to move the actuating lever 92 in a first step of 45°, then in a second step of an additional 45° so as to complete a 90° movement and then to retract actuating lever 92 to the initial position.

In the modification shown in Figs. 14–16, inclusive, clips 101 are pre-cut in staple form and placed in a magazine 104 in a manner well understood in the staple art. The staples are inserted through the crimped portions 117 of the lacing wire 116 and thereupon legs 102 are bent backward so that the completed clip resembles the clip of the preceding modification.

Lower coils 24 of volute springs 21 are located resting on support members 103. Between support members 103 are magazines 104 for clips 101. Magazine 104 has a pair of side guides 106, the space between the opposed inner edges of which is such as to accommodate a number of staples 101 in position with legs 102 pointing upwardly. A cover 107 hinged by means of hinge 108 to a cross member 109 interconnecting side guides 106 is raised when loading the clips in magazine 104. Depending from cover 107 are legs 111 which fit between the legs of the staples to maintain clips 101 in proper alignment. To insure feeding the next staple 101 into operating position as the preceding staple is consumed, a pusher 112 is propelled forwardly by means of spring 113 in the space between legs 111 in a manner well understood in the staple dispensing art. The staple is expelled by vertically moving expeller 114, as is likewise well understood in this art.

Crimped lacing wires 116 used in this modification of the invention have an exaggerated crimped portion 117 as compared with corresponding crimped portion 37 of the preceding modification and crimped portions 117 are connected to the main body of wire 116 by laterally offset portions 118. Lacing wires 116 are received in grooves 119 between the edges of members 103 and 106. Below wire 116 is a lifter 121 which moves vertically in slot 119 to raise wire 116 from loading position shown in Fig. 15 to an elevated position where crimped portion 117 is elevated above largest diameter coil 24.

Rotatable in split bushing 126, which is disposed in member 103, is a stub shaft 127. The lower end of shaft 127 carries an enlarged hub 128 which bears against the lower end of bushing 126 and below hub 128 is a gear 129 which meshes with a drive pinion 129a which also meshes with a corresponding gear 129 on adjacent shaft 127 so that the two shafts 127 rotate together (but in opposite directions). Shaft 127 may be caused to rotate by any convenient means in timed relation to the sequence of operation of the machine. The upper end of shaft 127 carries a radially projecting arm 131. The lower surface of arm 131 comprises an anvil 132 which functions to bend leg 102 of staple 101 in a manner well understood in the staple bending art.

In operation, at the commencement of the cycle, radial arms 131 are retracted to the dot and dash position shown in Fig. 14 and lifter 121 is retracted, leaving space in slot 119 for insertion of crimped lacing wire 116. After wire 116 has been inserted in slot 119, lifter 121 is raised, causing crimped portion 117 to rise above the elevation of coil 38. Thereupon gears 129 are turned so that arm 131 projects outwardly. The gears 129 are turned so that arm 131 projects outwardly. The slope of the underside of anvil portion 132 turns wire 116 through 90° as arm 131 moves outwardly, so that crimped portion 117 projects out over the edge of coil 24 and beyond the inner edge of member 106. Thereupon the staple expeller 114 pushes staple 101 upwardly and the ends of legs 102 come in contact with anvil 132 and are bent inwardly toward each other around and over crimped portions 117. Radial arms 131 are then returned to the dot dash position shown in Fig. 14 and members 114 and 121 are retracted downwardly. The next staple 101 is automatically fed into position by spring 113 and the cycle of operation is completed.

Although the foregoing invention has been described in some detail by way of illustration and example for purposes of clarity of understanding, it is understood that certain changes and modifications may be practiced within the spirit of the invention and scope of the appended claims.

What is claimed is:

1. Apparatus for clipping in position a bed spring construction comprising a support for the largest diameter coil of a volute bed spring, said support establishing a reference plane, said support being formed with a slot for the reception of a crimped lacing wire on a first side of said reference plane, first means for moving said lacing wire relative to said support to a position whereby at least a part of the crimped portion of said lacing wire is on a second side of said reference plane opposite said first side, second means to guide and provide access for a clip forming blank through the crimped portion of said lacing wire on said second side of said reference plane and on the side of said largest diameter coil opposite said reference plane, and third means for forming said blank to bend the end of said blank backwardly around said crimped portion.

2. Apparatus according to claim 1 in which said third means comprises an anvil, a slot in said anvil for reception of said blank, a rotatable cutoff lever cooperable with said anvil to sever said wire and subsequently to bend the end of said wire through substantially 180°.

3. Apparatus according to claim 1 in which said second means comprises a magazine for feeding staple-shaped clips and a staple expeller for discharging staples from said magazine and said third means comprises an anvil cooperable with said expeller to bend the legs of the staple-shaped clips back upon themselves, said anvil being retractable from operative to an inoperative position.

4. Apparatus according to claim 1 which further comprises means engaging said coil to hold said coil against said support.

5. Apparatus for clipping in position a bed spring construction comprising a support for each of at least two adjacent largest diameter coils of volute bed springs, said support establishing a reference plane, said support being formed with at least two parallel slots for the reception of crimped lacing wires on a first side of said reference plane and each underlying one of said coils and intercepting a short arc thereof, first means for moving said lacing wires relative to said support to a position whereby at least a part of each crimped portion of said lacing wires is on a second side of said reference plane opposite said first side, second means to guide and provide access for a clip forming blank through the crimped portions of each of an adjacent pair of lacing wires and bridging the gap between adjacent coils, said blank extending on the second side of said reference plane, and third means for bending said blank around said crimped portions with the ends of said blank extending toward each other.

6. In a bed spring assembly machine a support for the end coils of adjacent coil springs, said support being slotted for the reception of adjacent crimped lacing wires in positions to subtend short arcs of said end coils, a pair of shafts disposed under said support, parallel to and spaced inwardly of said slots, a pair of hold-down levers on each said shaft, a cut-off lever on each shaft between said pair of hold-down levers, each said hold-down lever being shaped with a finger to grip said end coil and hold said coil against said support and a cam to lift said lacing wire coil against said support and a cam to lift said lacing wire in the slot in said support to a position where the crimp in said lacing wire is lifted above said end coil, guide means for a tie wire to thread said wire over said end coils and under said crimps of adjacent coil springs, an anvil on said support under each said end coil positioned to cooperate with said cut-off lever to shear said tie wire, each said cut-off lever being shaped to bend backward the end of the sheared tie wire around and over said crimp in said lacing wire, and means to turn said shafts.

7. In a bed spring assembly machine, a support for the end coils of adjacent volute coil springs, means in said support for receiving lacing wires formed with crimps, hold-down means for securing said end coils in position relative to said support, elevating means for elevating lacing wires to a position with the crimps above the level of the end coils, means for guiding and providing access for tie wires transversely of said lacing wires over said end coils and under said crimps, anvils on said support, cut-off means cooperable with said anvils to shear off sections of tie wires, said cut-off means being shaped to engage the ends of sheared sections of tie wires and bend said ends back over said crimps and means for actuating said hold-down means, elevating means and cut-off means.

8. In a bed spring assembly machine, a support for the end coils of adjacent volute coil springs, means in said support for receiving lacing wires formed with crimps, a pair of hold-down levers each having a finger of arcuate shape positioned upon rotative movement of said hold-down lever to hook over said end coil and hold said end coil against said support, means for imparting rotative movement to said hold-down levers, elevating means for elevating lacing wires to a position with the crimps above the level of the end coils, means for guiding and providing access for tie wires transversely of said lacing wires over said end coils and under said crimps, anvils on said support, cut-off means cooperable with said anvils to shear off sections of tie wires, said cut-off means being shaped to engage the ends of sheared sections of tie wires and bend said ends back over said crimps, and means for actuating said elevating means and cut-off means.

9. In a bed spring assembly machine, a support for the end coils of adjacent volute coil springs, means on said support for receiving lacing wires formed with crimps, hold-down means for securing said end coils in position relative to said support, cam means shaped and positioned upon rotative movement of said cam means to contact the underside of said lacing wires and raise said lacing wires in said slots to elevate the crimps above the level of said end coils, means for imparting rotative movement to said cam means, means for guiding and providing access for tie wires transversely of said lacing wires over said end coils and under said crimps, anvils on said support, cut-off means cooperable with said anvils to shear off sections of tie wires, said cut-off means being shaped to engage the ends of sheared sections of tie wires and bend said ends back over said crimps, and means for actuating said hold-down means and cut-off means.

10. In a bed spring assembly machine, a support for the end coils of adjacent volute coil springs, means on said support for receiving lacing wires formed with crimps, hold-down means for securing said end coils in position relative to said support, elevating means for elevating lacing wires to a position with the crimps above the level of the end coils, means for guiding and providing access for tie wires transversely of said lacing wires over said end coils and under said crimps, anvils on said support, a cut-off lever shaped with a finger having a cutting edge on its leading edge cooperable with said anvil to shear off a section of tie wire, said finger having a rounded nose adjacent said leading edge to bend the end of the cut-off section upward around one of said crimps, said finger having a curved underside adjacent said nose to bend back said end over said crimp, and means to actuate said hold-down means, elevating means and cut-off means.

11. In a bed spring assembly machine, a support for the end coils of adjacent coil springs, said support being formed with a pair of parallel slots for the reception of adjacent crimped lacing wires in positions to subtend short arcs of said adjacent end coils, means in said slots for raising said lacing wires to elevate the crimped portions above the level of said end coils, a magazine for wire staples positioned in said support between said adjacent coil springs, means to eject staples from said magazine, a pair of shafts rotatable in said support about an axis parallel to the axis of said springs, a lever on each said shaft rotatable from an inoperative position within the confines of one of said coil springs to an operative position pointed toward the adjacent coil spring, said lever being shaped to engage and hold an end coil against said support and to bend said crimped portion outward over said magazine, said lever having an anvil disposed above said magazine in a position to be engaged by the leg of a staple ejected from said magazine and shaped to bend said leg around said crimped portion, means for turning said shafts, and means to move upwardly a staple ejected from said magazine to force the legs of said staple against said anvils to deform the legs of said staple about the lacing wires.

12. In a bed spring assembly machine, a support for the end coils of adjacent coil springs, said support being formed with a pair of parallel slots for the reception of adjacent crimped lacing wires in positions to subtend short arcs of said adjacent end coils, means in said slots for raising said lacing wires to elevate the crimped portions above the level of said end coils, a magazine for wire staples positioned in said support between said adjacent coil springs, means to eject staples from said magazine, a lever movable from an inoperative position within the confines of one of said coil springs to an operative position pointed toward the adjacent coil spring, means for moving said lever between operative and inoperative positions, said lever having a slanted undersurface to engage the crimped portion of said lacing wire and turn said crimped portion over said end coil and over said magazine, said lever having an anvil positioned over said magazine in the operative position of said lever shaped to bend the leg of a staple around said crimped portion, and means to move upwardly a staple ejected from said magazine to force the legs of said staple against said anvils to deform the legs of said staple about the lacing wires.

13. In a bed spring assembly machine, a support for the end coils of adjacent coil springs, said support being formed with a pair of parallel slots for the reception of adjacent crimped lacing wires in positions to subtend short arcs of said adjacent end coils, means in said slots for raising said lacing wires to elevate the crimped portions above the level of said end coils, means for receiving a wire staple in inverted position between adjacent coil springs, means for moving said staple upwardly, a lever movable from an inoperative position within the confines of one of said coil springs to an operative position pointed toward the adjacent coil spring, means for moving said lever between operative and inoperative positions, said lever having a slanted undersurface to engage the crimped portion of said lacing wire and turn said crimped portion over said end coil and over said magazine, said lever having an anvil positioned over said staple in the operative position of said lever shaped to bend a leg of said staple around and over said crimped portion.

14. In a bed spring assembly machine, a support for the end coils of adjacent coil springs, said support being slotted for the reception of adjacent crimped lacing wires in positions to subtend short arcs of said end coils, a pair of shafts disposed under said support, parallel to and spaced inwardly of said slots, a pair of hold-down levers on each said shaft, each said hold-down lever being shaped with a finger to grip said end coil and hold said coil against said support and a cam to lift said lacing wire in the slot in said support to a position where the crimp in said lacing wire is lifted above said end coil, and means to turn said shafts.

References Cited in the file of this patent
UNITED STATES PATENTS

| | | |
|---|---|---|
| 980,499 | Denning | Jan. 3, 1911 |
| 2,689,955 | Garcia | Sept. 28, 1954 |
| 2,781,515 | Juilfs | Feb. 19, 1957 |
| 2,801,418 | Jenny | Aug. 6, 1957 |